UNITED STATES PATENT OFFICE.

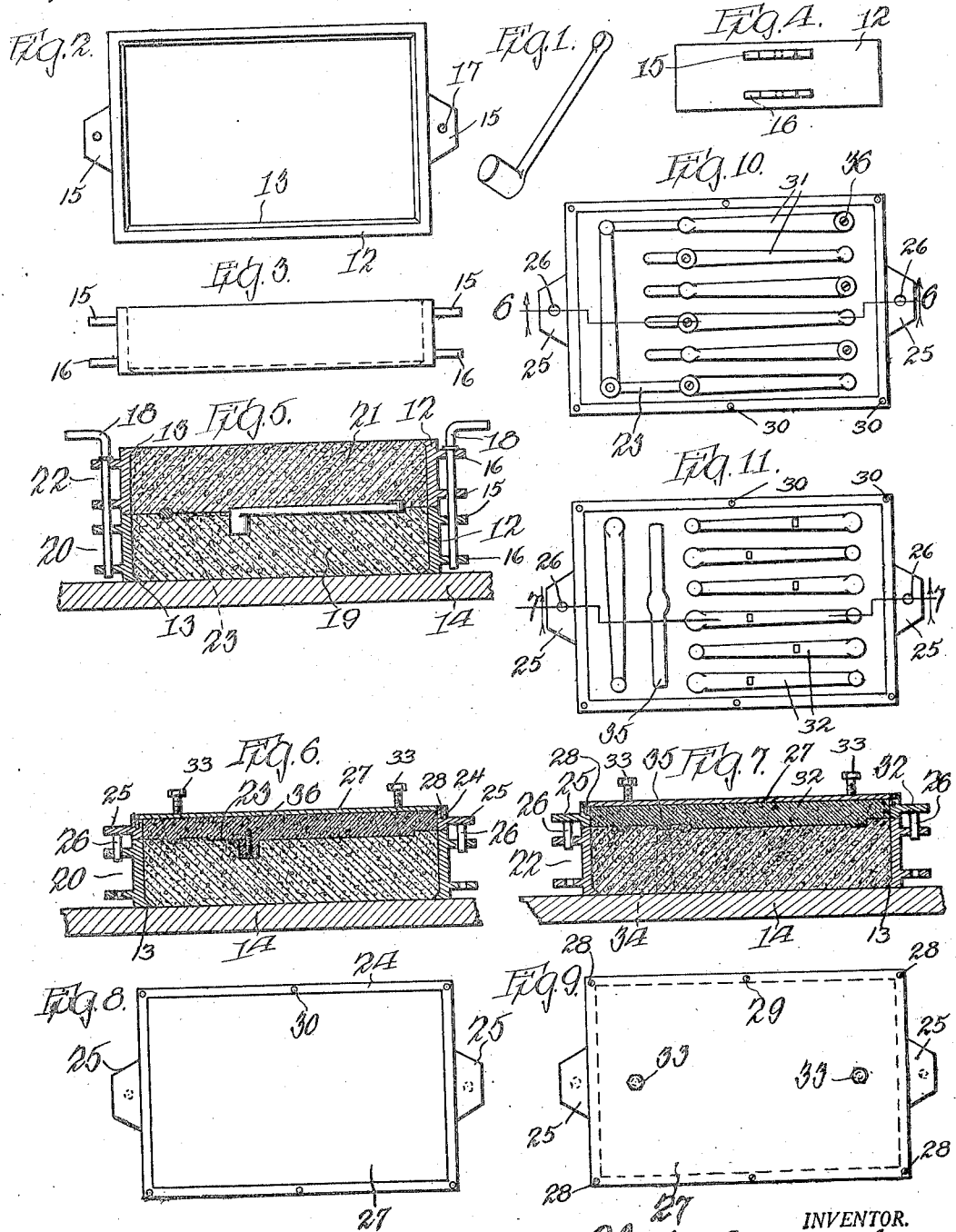

CHARLES M. MENEFEE, OF FORT WAYNE, INDIANA, ASSIGNOR TO THE MENEFEE FOUNDRY CO., INC., OF FORT WAYNE, INDIANA, A CORPORATION OF INDIANA.

FOUNDRY PATTERN COMPOSITION AND PROCESS AND APPARATUS FOR USING THE SAME.

1,303,097.     Specification of Letters Patent.     Patented May 6, 1919.

Application filed September 25, 1916. Serial No. 121,951.

*To all whom it may concern:*

Be it known that I, CHARLES M. MENEFEE, a citizen of the United States, residing at Fort Wayne, in the county of Allen and State of Indiana, have invented certain new and useful Improvements in Foundry Pattern Composition and Processes and Apparatus for Using the Same, of which the following is a specification.

My invention relates to a composition of matter for the purpose of producing patterns for use in the production of molds in foundries and to the process and apparatus for using such composition of matter.

One of the objects of my invention is the provision of a composition of matter for the production of a pattern and plate for carrying the same which will reduce the shrinkage of the pattern to a minimum.

A further object of the invention is the production of a composition of matter for patterns which will be strong and durable and in which the shrinkage will be reduced to a minimum.

Another object of my invention is the provision of a composition of matter for patterns which will have considerable strength, durability and smoothness, so that accurate castings can be made.

A further object of the invention is the provision of an improved process of producing patterns from a composition of matter.

Another object of my invention is the provision of improved means for receiving a composition of matter while being formed into a pattern, and for securely holding such pattern permanently in position after such composition of matter has become hardened.

Other objects of the invention will appear hereinafter, the novel features and combinations of elements being set forth in the appended claims.

My improved composition of matter consists essentially in the mixture of cement and dehydrated calcium sulfate introduced gradually into water while being continuously stirred until the proper consistency is attained. I prefer to use Portland cement because it is desirable to give hardness, but when set in air it has the property of shrinking, and to counteract that tendency a sufficient amount of plaster of Paris is embodied in the mixture. I have found in practice that good results are obtained by the employment of a mixture composed of 70% of Portland cement by weight, and 30% of plaster of Paris by weight; this mixture should be introduced gradually into a volume of water which by weight is about one half of the weight of the mixture of Portland cement and plaster of Paris. For instance, if the weight of the mixture of the Portland cement and plaster of Paris is approximately twenty pounds, then about ten pounds of water should be used.

The mixture of Portland cement and plaster of Paris should be introduced gradually into the water while the latter is being stirred, to obtain a thorough mixture with the water. While the amount of water may be varied according to the consistency of the wet mixture desired, it is preferable to obtain a comparatively thin mixture so that it can be easily poured and so that it will flow freely into all of the small spaces of a foundry mold. It is preferable to have the wet mixture of such a consistency that it will take about twelve hours to set sufficiently to enable workmen to clean the molding sand therefrom. Although the mixture has a tendency to stick to the molding sand, the latter may be easily scraped off without interfering with the accuracy of the composition pattern. After the molding sand has been cleaned from the composition pattern and the composition plate with which it is integral, it is preferable to allow the pattern and plate to harden for two or more days before being used, because aging strengthens the composition pattern.

Portland cement varies somewhat as to its ingredients and the percentage or proportion of its ingredients, and therefore varies in its amount of shrinkage when set in air; hence the amount of plaster of Paris should be varied accordingly. I have found in practice, however, that over 40% by weight of the plaster of Paris is not desirable because sufficient Portland cement should be used to give strength and durability to the pattern.

In order to prolong the life of the composition patterns I prefer to add to the mixture of Portland cement and plaster of Paris, a cement hardener sold on the market for the purpose of hardening or strengthening mixtures in which Portland cement is used. I prefer to use a cement hardener containing a mixture of iron, iron oxid and a small amount of carbon. This cement hardener not only increases the strength and durability of the patterns made by my improved composition, but also increases the smoothness of the surface of such patterns. This cement hardener is particularly desirable when the pattern has such projecting parts or edges as are subject to considerable wear and tear. The hardener has the advantage of strengthening the entire body of the composition including the corners, edges and projecting parts subject to the most wear because it acts as a binder for the other ingredients.

I desire, however, not to be limited to a binder which is a cement hardener because other binders may be used, if desired; nor do I wish to be limited to a cement hardener containing iron oxid and carbon, as iron filings alone may be used to obtain the requisite hardening of the composition when such is desirable for some patterns. I prefer to include both iron filings and iron oxid, but the carbon may be omitted. In some instances, however, patterns may be made of composition consisting of Portland cement and plaster of Paris without the addition of the cement hardener, but I prefer to include a mixture of iron filings and iron oxid.

I prefer, however, to include in the composition a cement hardener or iron filings or the filings of some other metal which is oxidizable on exposure to the atmosphere and which, when oxidation takes place tends to expand the substance with which it is mixed. Cement hardener contains iron filings which on exposure to the atmosphere tend to slowly oxidize and counteract the tendency of the Portland cement to shrink. While plaster of Paris counteracts the shrinkage of the Portland cement upon setting in the air, the oxidation of the metal filings counteracts the continual slight shrinkage of the Portland cement over a long period of time. The composition pattern and match plate are quite porous after being set and hardened, which permits entrance of air into the body of the material. Furthermore, on account of the porosity of the hardened composition, even when including the cement hardener or metal filings, such composition readily absorbs moisture and conveys it throughout the interior of the body portion.

A chemical analysis of a sample of Portland cement which I have used in carrying out my invention, shows the following ingredients and the proportions thereof:

| | |
|---|---|
| Silica ($SiO_2$) | 22.80% |
| Alumina ($Al_2O_3$) | 5.70% |
| Iron oxid ($Fe_2O_3$) | 2.85% |
| Lime, free (CaO) | 1.65% |
| Calcium carbonate ($CaCO_3$) | .84% |
| Lime combined with silica | 60.06% |
| Calcium sulfate ($CaSO_4$) | 1.16% |
| Magnesia (MgO) | 4.13% |
| Alkalis ($Na_2O$) | .65% |
| Impurities | .16% |

Of the above substances of which the proportions by weight are given, only silica, alumina and lime are necessary to produce Portland cement when heated to incipient fusion. The other ingredients are therefore not essential and may be omitted if desired.

A chemical analysis of the cement hardener which I have successfully used in practice shows the following proportions by weight:

| | |
|---|---|
| Oxid of iron | 28.62% |
| Powdered cast iron | 71.37% |
| Flake graphite | .01% |

A chemical analysis of a sample of the mixture of Portland cement, plaster of Paris and cement hardener which I have used in practice for the production of composition patterns, shows the following proportions by weight:

| | |
|---|---|
| Iron, powdered, (Fe) | 15.60% |
| Silica ($SiO_2$) | 12.90% |
| Alumina ($Al_2O_3$) | 8.07% |
| Iron oxid ($Fe_2O_3$) | 4.71% |
| Lime, free (CaO) | 1.30% |
| Carbonate of lime ($CaCO_3$) | .75% |
| Lime combined with silica | 29.81% |
| Calcium sulfate ($CaSO_4$) | 23.29% |
| Magnesia (MgO) | 2.70% |
| Alkalis ($Na_2O$) | .52% |
| Impurities | .35% |

The plaster of Paris in the mixture containing the Portland cement and cement hardener is indicated by the calcium sulfate, because plaster of Paris is calcium sulfate which has been heated to 100° C. or a little above when it loses nearly all its water, forming a powder known as plaster of Paris, which has the property of being able to take up water and forming a solid substance when it sets.

A sample of the composition after having been molded and set to produce the composition pattern from a mixture of Portland cement, cement hardener, plaster of Paris and water, shows the following proportions by weight:

| | |
|---|---|
| Iron, powdered (Fe) | 13.90% |
| Silica ($SiO_2$) | 12.10% |
| Alumina ($Al_2O_3$) | 6.45% |
| Iron oxid ($Fe_2O_3$) | 5.26% |
| Lime, free (CaO) | .40% |
| Carbonate of lime ($CaCO_3$) | 1.36% |
| Lime combined with silica | 30.00% |
| Calcium sulfate ($CaSO_4$) | 19.96% |
| Magnesia (MgO) | 2.53% |
| Alkalis ($Na_2O$) | .45% |
| Water combined ($H_2O$) | 7.50% |
| Impurities | .08% |

While I have set forth the proportions of ingredients which I have found to be successful in practice, I do not wish to be limited thereto as it is obvious that those skilled in the art may vary such proportions to some extent without departing from the spirit and scope of my invention as defined by the claims hereto appended. For instance, a satisfactory formula for practical operation is the mixture of fifty pounds of plaster of Paris, forty pounds of a mixture of iron filings (seventy per cent.) and oxid of iron (thirty per cent.), and one hundred and ninety pounds of Portland cement, to form a compound fifty pounds of which when mixed with twenty-five pounds of water will produce a convenient amount to work with.

In the accompanying drawings—

Figure 1 is an elevation of a crank intended particularly for a gasolene measuring pump;

Fig. 2 is a plan view of a molding flask;

Fig. 3 is a side elevation of Fig. 2;

Fig. 4 is an end elevation of Fig. 2;

Fig. 5 is a sectional elevation of the drag or nowel and the cope flasks for producing molds in molding sand;

Fig. 6 is a sectional elevation of mechanism for producing a composition match plate and pattern;

Fig. 7 is a sectional elevation similar to Fig. 6 except that it includes the cope of said mold whereas Fig. 6 shows the nowel or drag sand mold;

Fig. 8 is a plan view of the upper frame shown in Figs. 6 and 7;

Fig. 9 is a plan view of the cover plate for the frame shown in Fig. 8;

Fig. 10 is a view illustrating the finished drag match plate with a plurality of patterns integral therewith; and Fig. 11 is a view illustrating a cope match plate with a plurality of patterns integral therewith.

In order to illustrate a useful application of my improved process and composition of matter made thereby, I have shown in the accompanying drawings, improved apparatus for producing a plurality of patterns on a match plate. In Fig. 1 is illustrated the article which is to be reproduced in quantities. The molder's flask which is preferred consists of a rectangular frame 12, as shown in Fig. 2, provided with an inwardly extending bottom flange 13 to assist in holding the molder's sand therein after being securely packed while lying on a board 14. The ends of the flask 12 are provided with perforated projections 15 and 16, the vertical openings in which should be in substantially vertical alinement so that the flasks will fit accurately over each other, as shown in Fig. 5, when the metal pins 18, 18 are inserted therethrough.

With a single pattern, as shown in Fig. 1, a plurality of imprints may be made in the sand 19 of the nowel or drag flask 20 and corresponding imprints in the sand 21 of the cope flask 22. The gates 23 may be produced by manual operation.

After the imprints have been made in the sand of the drag and cope flasks, and after being properly dusted, they are immediately ready for the pouring of the composition. The drag flask 20 is placed on the board 14 in its original position, as shown in Fig. 6, while the cope flask 22 is turned upside down so as to expose its imprints on its upper surface. Iron frames are now placed over the drag flask 20 and over the cope flask 22. These frames are rectangular in shape and correspond in length and breadth to the drag and cope flasks. The ends of the frame 24, as shown in Fig. 8, are provided with perforated extensions or ears 25, 25 which have downwardly projecting pins 26, 26 which fit into the perforations 17 of the ears 15 and 16. As shown in Fig. 7, a similar frame is placed over the cope flask 22 and held accurately in position by the pins 26 which project downwardly from the ears 25 into the perforations in the ears 15 and 16. It should be understood that the frames 24 when first placed over the drag and cope flasks are open on both sides.

After the composition of matter hereinbefore described has been mixed with water and brought to the proper consistency, it is immediately poured into the frames 24 so as to fill the imprints in the sand of the drag and cope flasks 20 and 22. The frames 24 are preferably filled heaping full, that is to say above the upper edge of the frame 24, but not so as to run over the same. After this is done, and before the wet mixture ceases to flow freely, the cover plate 27 is screwed onto the frame 24 by means of the screws 28, holes 29 being provided in the plate 27 and screw-threaded holes 30 being provided in the frame 24. When the plate 27 is screwed into position, the surplus wet mixture will overflow while the pressure is sufficient to insure proper casting of the composition. Only a short interval should elapse between the time that the material is poured into the frame 24 and the time that the plate 27 is screwed down, because otherwise the wet mixture will become sufficiently viscous to cause the frame 24 to lift from the sand flask. It is important that such separation of the frame 24 from the sand flask should not take place, because such separation would destroy the accuracy of the composition pattern. After the wet mixture has been poured and the cover plate 27 screwed into place, the apparatus shown in Figs. 6 and 7 is permitted to stand for about twelve hours, when the drag match plate and pattern 31 is removed and likewise the cope match plate 32. Some sand may stick to the hardened composition but this is immaterial as it can easily be removed and the sand molds were intended only for the casting of the composition. Fig. 10 illustrates the drag match plate and pattern and pattern 31 while Fig. 11 represents the cope match plate 32. It can readily be seen that the drag and cope match plate and patterns shown in Figs. 10 and 11 may now be used for producing sand molds in drag and cope flasks to any desired extent.

Bolts 33, 33 are provided on the cover plates 27 for attachment to a molding machine. The drag match plate and pattern 31 is fastened to the molding machine with the plate 27 on its under side in a horizontal position. The drag flask 20 is placed over the same and the sand packed on the composition pattern and match plate. The match plate and pattern 31 while clamped to the flask 20, is turned completely over, together with the drag flask 20. After the flask 20 and match plate and pattern 31 assume the position shown in Fig. 6, the match plate is withdrawn vertically from the flask 20 while being rapidly vibrated. In a similar manner the cope is molded, except that before the cope flask is turned to the position shown in Fig. 7, a pouring hole 34 is produced by inserting a tube entirely through the sand of the flask to the gate 35. When placed on the floor of the foundry, the drag flask 20 is on the lower side, and the cope flask 22 turned over from the position shown in Fig. 7, occupies the upper side, as shown in Fig. 5. Accuracy of the fit of the flasks over each other is produced by the pins 18, 18 shown in Fig. 5.

The gating of the foundry mold is particularly important when a plurality of castings are to be made in one flask. If the gates are too small, the metal will not flow freely to the various imprints in the sand, whereas if the gates are too large, attempted separation of the castings tends to injure them. My improved composition of matter is particularly adapted to variation of the sizes of the gates as may be desired. If the sprues which form the gates are too large they may easily be made smaller as the composition of matter can be scraped off without much difficulty. If the sprues which form the gates are too small they may be enlarged even after having been set and hardened, by the application of wet mixture thereto having the composition hereinbefore described. I have found in practice that after the match plate and pattern has been finally completed, additions may be made thereto by the application of wet mixture and the molding thereon with hand tools, and that such addition becomes substantially integral with the body portion of the composition. It should also be understood that the composition of matter hereinbefore described is also adapted to have partially embedded therein pieces of metal to become a part of the composition match plate and pattern, permanently connected to the match plate. This is particularly true in such instances where such metal pieces can be readily made by the pattern maker. Reference to this is made to point out that the making of the molds by means of the composition patterns is carried out in places of uniform temperature. However, the coefficient of expansion of the metal and the composition do not differ sufficiently to make any practical difference as to the use of metal embedded in the composition, or as to the use of metal frames and cover plates for permanently holding such composition.

If desired, the composition may be reinforced by metallic parts such as screws 36 resting on the bottom of the cylindrical imprint shown in Fig. 6 and extending into the composition match plate. Parts of the composition may be reinforced by metallic rods, screws, etc., wherever there is any projecting part which might be broken off.

When cement hardener containing iron oxid is added to the mixture of Portland cement and dehydrated calcium sulfate, the color becomes a reddish brown, due to the color of the iron oxid, but on account of its being set with the cement and plaster of Paris, it does not wear off during the ordinary use of the match plate patterns, and keeps the surfaces smooth by assisting in filling up the pores which tend to form more freely when the cement and plaster of Paris are used without the cement hardener. The strength and durability of the composition match plate and pattern mounted as shown in Figs. 6, 7, 10 and 11, is maintained in practice and so also is the smoothness and accuracy of the various portions of the composition patterns. While wooden patterns may be used to some extent repeatedly, their life is comparatively short, and furthermore if wooden patterns are used after having been stored for some time, it will be found that shrinkage has taken place; such shrinkage is greatly minimized in the composition patterns hereinbefore described. Match patterns have been made of brass by securing a plurality of them to metal framework. It is difficult to accurately place such metal patterns on the framework or gatesprues both on account of the fastenings necessary and the measurements to get the parts exactly opposite each other. On account of the metal construction of the gate-sprues the number of patterns that can be made for a flask of a given size, is greatly reduced. Such brass patterns are expensive, particularly when great quantities of them must be carried in stock. An important feature of my invention is the use of match plates and patterns with the latter so arranged as to increase the number thereof in a flask of a given size. When such a plurality of patterns are made from my improved composition of matter, the expense is greatly reduced, not only as to the material, but also as to the necessary labor. Furthermore the accuracy is increased.

In other words, the use of my improved composition of matter greatly reduces the expense of foundry operation. This is particularly true when a number of castings are to be made in one flask at a single pouring. After several small patterns have been made of metal in previous practice, it was essential that they be sprued up, that is to say connections made between them for the purpose of making imprints or gates in the molding sand for the flow of the molten metal into every compartment. If a number of castings are to be made in one flask, the pattern had to be made up of a corresponding number of metal patterns all connected together in series, so that the connections would make imprints to afford passageways between the regular molds. This spruing up of the metal patterns could be effected only at considerable expense, because generally required to be done by the patternmaker. This was also true of the patterns made of wood and sprued up.

By the use of my improved composition, however, the necessity of spruing patterns by the patternmaker is entirely eliminated, as the patterns can be made by means of my improved composition, and the sprues can be made in the composition at the same time that the composition patterns are poured or cast. The spruing by means of composition is done in a comparatively short time and at a greatly reduced cost over metal pattern sprues or hand made wooden pattern sprues. Furthermore composition sprues may be reduced or increased in size whenever desired, much more readily than metal or wooden sprues. A single wooden pattern may be used successively in the drag or nowel and the cope of the flasks containing molding sand, wooden partitions being used to separate the compartments. After the imprints have been made in the various compartments, the imprints for the sprues are produced by manual work in the molding sand between the imprints made by the wooden pattern. When a new wooden pattern or metal pattern is delivered to a foundry, a composition pattern can be readily reproduced with comparatively small expense, and the original pattern immediately returned to the owner. Wooden or metal patterns when used in a foundry continuously in the process of molding, become worn and in time must be repaired or replaced by new ones. By making composition patterns from the original wooden or metal patterns, such composition patterns may be used a great many times without showing any wear, while the original patterns are preserved for future use if necessary or may be returned to the owner with practically no wear whatever thereon. Patterns and match plates made entirely of composition are preferable to metal patterns because the latter have a tendency to "sweat" or condense moisture in the molding sand and cause the latter to stick to the metal, thus making it difficult to make a proper mold. By the use of patterns made entirely of the aforesaid composition, the objection of sweating is not encountered and therefore there is no sticking whatever between the dry and hard composition of matter and the molding sand when the imprints are being made in such sand. Metal tends to withdraw the moisture from the sand and cause sticking, while the composition does not tend to cause any sweating on account of variation of temperature, and therefore no sticking occurs.

While I have set forth in the foregoing specification the preferred composition of matter, the preferred process of making the same, the preferred process of making composition patterns and match plates, and the preferred mechanism for such process and such match plates and patterns, it should be understood that the proportions of the ingredients might be varied without departing from the spirit and scope of my invention as defined by the claims hereto appended; however, the composition of matter is particularly adapted to the construction of patterns for use in foundries, because of its non-shrinkable character. The composition patterns including the mechanism for producing the same, may also be varied by those skilled in the art, without departing from the scope and spirit of my invention as defined by the claims hereto appended. I desire therefore not to be restricted to the precise proportions of the ingredients, nor to the precise process herein disclosed, nor do I wish to be limited to the precise apparatus shown in the drawings.

Having thus fully described my invention, what I desire to have protected by Letters Patent of the United States is:

1. A foundry pattern composition of matter consisting of Portland cement and plaster of Paris mixed with water, set and hardened.

2. A foundry pattern comprising a shallow metal flask comprising an open frame and a plate closing one side thereof, and a plate of composition of matter consisting of Portland cement, plaster of Paris, and a cement hardener cast into said flask when mixed with water for permanent contact with said flask after the compound sets and hardens.

3. A foundry pattern composition of matter consisting of cement, plaster of Paris, and a cement hardener compounded by mixture with water.

4. A composition of matter for foundry patterns consisting of a cement, plaster of Paris and an oxidizable substance, mixed together, and such mixture adapted to be mixed with water for compounding into a solid state.

5. An intimate mixture of Portland cement, plaster of Paris and an oxidizable metal, each in a finely divided state, such mixture being adapted to be compounded into a foundry pattern composition of matter by mixture with water, setting and hardening.

6. A composition pattern adapted for use in foundries, consisting of cement, plaster of Paris, and an oxidizable metal in a finely divided state, compounded into such composition by mixture with water, setting and hardening.

7. A composition pattern for foundries, consisting of Portland cement, plaster of Paris, and iron filings, compounded by mixture with water, setting and hardening.

8. A foundry pattern composition of matter consisting of approximately 70 per cent. of Portland cement by weight, 30 per cent. of plaster of Paris by weight, and a volume of water equal in weight to approximately one-half the combined weight of the Portland cement and plaster of Paris.

9. A foundry pattern composition comprising silica, alumina, lime, calcium sulfate, iron filings, and oxid of iron, compounded by mixture with water, set and hardened.

10. A process for producing pattern composition which consists in mixing Portland cement and plaster of Paris and then introducing said mixture into water while stirring the latter and allowing the wet mixture to set and harden.

11. A process of producing foundry pattern composition consisting in mixing Portland cement, plaster of Paris, and a cement hardener with water, and permitting the mixture to set and harden.

12. A process for producing composition patterns for foundries, consisting in mixing Portland cement, plaster of Paris, and a cement hardener with water and pouring the wet mixture into a frame fitting a foundry mold and allowing the composition to set and harden to form a match plate pattern.

13. A process for producing foundry patterns consisting in mixing cement, plaster of Paris, metal in a finely divided state and water, then pouring the wet mixture into a frame fitting a foundry mold having pieces of metal therein and allowing the composition to set and harden in the frame around the pieces of metal to form match plate patterns.

14. A substantially non-shrinkable foundry pattern composition of matter consisting of Portland cement, plaster of Paris, a metal in a finely divided state, and metallic oxid compounded by mixture with water, set and hardened.

15. A foundry pattern comprising a metal frame, a plate of composition permanently and tightly fitting said frame for permanent inclosure by said frame, parts of a pattern extending from said composition plate and formed integrally therewith, and metal parts of the pattern held securely in said plate in coöperative relation with the first-mentioned pattern parts to complete a pattern held permanently in said frame in fixed relation thereto in readiness for use with the latter in a molding machine in various positions.

16. A foundry pattern comprising a rectangular frame fitting the flask sections of a foundry mold, a plate of composition inclosed by said frame, and a pattern extending from said plate and integral therewith, said plate and pattern consisting of Portland cement, plaster of Paris, a cement hardener, and water.

17. A substantially non-shrinkable foundry pattern comprising a frame adapted to fit the flask sections of a foundry mold, a plate of composition permanently inclosed by said frame and in permanent and intimate contact with said frame, a plurality of pattern parts extending from said composition, and metal parts embedded in said plate and forming parts of patterns permanently connected by means of said plate to said frame in ever-readiness for use with the latter in a molding machine in various positions.

18. A foundry pattern composition of matter consisting of Portland cement, iron oxid, iron in a finely divided state, and plaster of Paris compounded by mixture with water, set and hardened.

19. A mixture of Portland cement, plaster of Paris, and a cement hardener, all in a dry state suitable for transportation, said ingredients being in proportions adapted to form, when mixed with water and allowed to set and harden in molds, foundry patterns and match plates.

20. A mixture of Portland cement, plaster of Paris, and an oxidizable substance in a finely divided state, the said ingredients being in a dry state suitable for transportation and in proportions adapted to form, when mixed with water and allowed to set and harden in molds, foundry match plates and patterns.

21. A composition of matter adapted for the manufacture of patterns and match plates which consists of plaster of Paris fifty parts, iron filings twenty-eight parts, oxid of iron twelve parts, Portland cement one hundred and ninety parts, all by weight, mixed with water.

22. A foundry pattern comprising a frame, a plate of composition inclosed by said frame and composed of Portland cement, plaster of Paris and a cement hardener, and a metal part projecting from said plate of composition and forming a part of such pattern.

23. A foundry pattern comprising a plate of composition consisting of Portland cement, plaster of Paris and a cement hardener, and a plurality of small metal parts connected to said plate and projecting therefrom to coact with said plate to form such pattern.

24. A foundry pattern comprising a metal frame, a plate of composition inclosed by said frame, and a plurality of metal parts permanently secured to said plate during the manufacture thereof and projecting from said plate to coact therewith to form such pattern, said composition consisting of Portland cement, plaster of Paris and a cement hardener.

25. A process for producing a foundry pattern consisting in mixing Portland cement, plaster of Paris, and a cement hardener, with water, and pouring the wet mixture into a frame fitting in a foundry mold, fitting a plate to said frame immediately after such pouring and while the said wet mixture is still in a freely flowing state, and securing said plate to said frame without causing the latter to alter its fit with said foundry mold, and allowing the mixture to set and harden to form a match plate pattern permanently secured to said frame and said plate.

26. A foundry pattern comprising a frame adapted to fit the flask sections of a foundry mold, a plate of composition inclosed by said frame and permanently in contact therewith to permanently fit in said frame, a pattern extending from said composition plate and formed integrally therewith, said composition plate and said projecting pattern consisting of such ingredients as to retain said pattern of substantially the same size permanently, whereby said frame and said pattern are ever ready for use in a molding machine.

27. A foundry pattern comprising a frame adapted to fit the flask sections of a foundry mold, a bottom plate for said frame, a plate of composition permanently inclosed by said frame and permanently in intimate contact therewith as well as with said bottom plate, a pattern projecting from said plate of composition on the open side of said frame, said composition consisting of such ingredients as to retain said plate of composition in permanently fitting connection with said frame and said bottom plate, to enable said frame and pattern to be used any time in a molding machine in various positions.

28. A foundry pattern comprising a metal frame, a metal plate closing one side of said frame, and a plate of composition composed of Portland cement, plaster of Paris and a cement hardener, in intimate and permanent contact with said frame and said plate, with the composition pattern exposed at the open side of said frame.

29. A foundry pattern comprising a plurality of compounded ingredients and a reinforcement embedded in a projecting part of said pattern to strengthen such projecting part.

30. A process for producing foundry patterns which consists in compounding a plurality of ingredients with water and pouring the wet mixture into a frame fitting a foundry mold having means in position therein to be embedded into the projecting parts of the pattern to strengthen such projecting parts.

31. A foundry pattern comprising a metal frame, a metal back plate, a plate of composition composed of Portland cement, plaster of Paris and a cement hardener and fitting said frame and said back plate and a piece of metal extending from the outer surface of a projecting part of the pattern into said plate by being embedded in the composition of matter to strengthen such projecting part.

32. A foundry pattern comprising a frame having spaced-apart pins adapted to fit the flasks of a foundry mold, a back plate fitting said frame, means secured to said back plate and frame to adapt the said plate and frame to be used in a molding machine, and a pattern plate in permanent contact with said frame and said back plate for permanent fit therein, said plate consisting of Portland cement, plaster of Paris, powdered cast iron and oxid of iron compounded with water, set and hardened.

33. A foundry pattern comprising a metal frame adapted to fit the flasks of a foundry mold, a metal back plate secured to said frame, spaced-apart bolts for securing said plate and said frame in a molding machine, a pattern plate composed of Portland cement, plaster of Paris, metal in a finely divided state and an oxid of the same metal, compounded with water, set and hardened in permanent contact with said frame and said plate and irremovable to maintain a fixed and permanent relation between said pattern and said frame.

34. The process for manufacturing match plates and patterns which consists in forming molds from the article to be reproduced, fitting metal frames to said molds, pouring a wet mixture of Portland cement, plaster of Paris, iron and iron oxid into the molds, securing plates to said frames while the wet mixtures are still in a freely flowing state, allowing the compounded mixtures to set and harden and then removing and finishing the composition match plates and patterns, and finally producing new molds from said match plates and patterns by the use of the latter in a molding machine.

35. A composition plate and pattern having projecting parts integral with said plate, and reënforcements embedded in such projecting parts.

36. A composition pattern consisting of Portland cement, plaster of Paris, and a cement hardener compounded by mixture with water, setting and hardening, and metal reënforcements in the projecting parts of the pattern.

37. A mixture of less than 23 per cent. of plaster of Paris, less than 19 per cent. of cement hardener composed of finely divided iron and iron oxid, and less than 68 per cent. of Portland cement, adapted to be compounded with water to form match plates and patterns for use in foundries, the proportions of the ingredients being such that the tendency of the plaster of Paris will substantially counteract the tendency of the Portland cement to shrink when mixed with water and set in air to form a porous body, and the gradual oxidation of the iron by moisture absorbed by said porous body will tend to counteract the gradual shrinkage of said Portland cement over a long period of time.

38. A composition of matter adapted for the manufacture of match plates and patterns for use in foundries, consisting of Portland cement, plaster of Paris, and iron in a finely divided state, the proportions of the ingredients being such that the tendency of the plaster of Paris will substantially counteract the tendency of the Portland cement to shrink when mixed with water and set in air to form a porous body, and the gradual oxidation of the iron by moisture absorbed by said porous body will tend to counteract the gradual shrinkage of said Portland cement over a long period of time.

39. A composition of matter for match plates and patterns for use in a foundry, consisting of Portland cement, plaster of Paris, iron in a finely divided state, and iron oxid, in such proportions that when mixed with water and set and hardened the tendency of the Portland cement to shrink will be counteracted by the tendency of the plaster of Paris to expand, when setting in air, and the oxidation of the air by gradual absorption of moisture from the atmosphere into the porous body of the composition will counteract the tendency of the Portland cement to shrink over a long period of time, and wherein the iron oxid furnishes a smooth exterior surface to the match plates and patterns, without interfering substantially with such moisture absorbing porosity of said body of material.

In testimony whereof I have signed my name to this specification, in the presence of the subscribing witnesses, on this 18th day of September, A. D. 1916.

CHARLES M. MENEFEE.

Witnesses:
RUSSEL McCLURE,
FANNIE BAUGHMAN,
EDNA BANISTER.